US012430951B2

(12) United States Patent
Liu et al.

(10) Patent No.: US 12,430,951 B2
(45) Date of Patent: Sep. 30, 2025

(54) METHOD AND SYSTEM FOR DETECTING HAND GESTURE, AND COMPUTER READABLE STORAGE MEDIUM

(71) Applicant: HTC Corporation, Taoyuan (TW)

(72) Inventors: Yen Ting Liu, Taoyuan (TW); Yu Heng Hong, Taoyuan (TW)

(73) Assignee: HTC Corporation, Taoyuan (TW)

( * ) Notice: Subject to any disclaimer, the term of this patent is extended or adjusted under 35 U.S.C. 154(b) by 624 days.

(21) Appl. No.: 17/852,390

(22) Filed: Jun. 29, 2022

(65) Prior Publication Data
US 2023/0145728 A1 May 11, 2023

Related U.S. Application Data

(60) Provisional application No. 63/275,958, filed on Nov. 5, 2021.

(51) Int. Cl.
G06V 40/20 (2022.01)
G06T 7/70 (2017.01)
G06V 10/98 (2022.01)

(52) U.S. Cl.
CPC ............. G06V 40/28 (2022.01); G06T 7/70 (2017.01); G06V 10/98 (2022.01); G06T 2207/30196 (2013.01)

(58) Field of Classification Search
CPC .......... G06F 3/017; G06F 1/163; G06F 18/24; G06F 3/011; G06F 3/04883; G06V 40/28;
(Continued)

(56) References Cited

U.S. PATENT DOCUMENTS

2013/0278501 A1  10/2013  Bulzacki
2019/0138107 A1*  5/2019  Nietfeld ............... A63F 13/428
(Continued)

FOREIGN PATENT DOCUMENTS

CN  111045511  4/2020
TW  I544367  8/2016
TW  I581178  5/2017

OTHER PUBLICATIONS

"Office Action of Taiwan Counterpart Application", issued on May 4, 2023, p. 1-p. 11.

Primary Examiner — Sumati Lefkowitz
Assistant Examiner — Aaron Joseph Sorrin
(74) Attorney, Agent, or Firm — JCIPRNET

(57) ABSTRACT

The embodiments of the disclosure provide a method and a system for detecting a hand gesture, and a computer readable storage medium. The method includes: determining whether information of a hand is enough for identifying a hand gesture of the hand; in response to determining that the information of the hand is enough for identifying the hand gesture, identifying the hand gesture, receiving first hand gesture information from at least one external gesture information provider, and correcting the hand gesture based on the first hand gesture information; in response to determining that the information of the hand is not enough for identifying the hand gesture, receiving second hand gesture information from the at least one external gesture information provider, obtaining a predicted hand gesture, and obtaining the hand gesture based on the predicted hand gesture and the second hand gesture information.

20 Claims, 4 Drawing Sheets

(58) Field of Classification Search
CPC .... G06V 40/107; G06V 10/98; G06V 40/113; G06T 19/006; G06T 2207/10028; G06T 7/20; G06T 7/70; G06T 2207/30196; B60K 35/23

See application file for complete search history.

(56) References Cited

U.S. PATENT DOCUMENTS

| | | | |
|---|---|---|---|
| 2020/0097065 | A1 | 3/2020 | Iyer et al. |
| 2021/0322824 | A1* | 10/2021 | Evans ................. A63B 71/0622 |
| 2024/0296697 | A1* | 9/2024 | Xu ........................... G06F 1/163 |

* cited by examiner

METHOD AND SYSTEM FOR DETECTING HAND GESTURE, AND COMPUTER READABLE STORAGE MEDIUM

CROSS-REFERENCE TO RELATED APPLICATION

This application claims the priority benefit of U.S. provisional application Ser. No. 63/275,958, filed on Nov. 5, 2021. The entirety of the above-mentioned patent application is hereby incorporated by reference herein and made a part of this specification.

BACKGROUND

1. Field of the Invention

The present disclosure generally relates to a tracking mechanism, in particular, to a method and a system for detecting a hand gesture, and a computer readable storage medium.

2. Description of Related Art

See FIG. 1, which shows a schematic diagram of hand gesture tracking. In the left part of FIG. 1, the head-mounted display (HMD) 100 may be disposed with a tracking element (e.g., a tracking camera on the HMD 100), and the tracking element may have a field of view (FOV) 199. When a to-be-tracked object (e.g., the hand 102) is in the FOV 199, the HMD 100 would be able to track the pose (e.g., the hand gesture of the hand 102) of the to-be-tracked object since the images of the to-be-tracked object are available.

However, when the to-be-tracked object leaves the FOV 199 as exemplarily shown on the right part of FIG. 1, the HMD 100 would be unable to track the pose of the to-be-tracked object since the images of the to-be-tracked object are unavailable.

SUMMARY OF THE INVENTION

Accordingly, the disclosure is directed to a method and a system for detecting a hand gesture, and a computer readable storage medium, which may be used to solve the above technical problems.

The embodiments of the disclosure provide a method for detecting a hand gesture, adapted to a host, including: determining whether information of a hand is enough for identifying a hand gesture of the hand; in response to determining that the information of the hand is enough for identifying the hand gesture, identifying the hand gesture, receiving first hand gesture information from at least one external gesture information provider, and correcting the hand gesture based on the first hand gesture information; in response to determining that the information of the hand is not enough for identifying the hand gesture, receiving second hand gesture information from the at least one external gesture information provider, obtaining a predicted hand gesture, and obtaining the hand gesture based on the predicted hand gesture and the second hand gesture information.

The embodiments of the disclosure provide a system for detecting a hand gesture. The system includes a host. The host is configured to perform: determining whether information of a hand is enough for identifying a hand gesture of the hand; in response to determining that the information of the hand is enough for identifying the hand gesture, identifying the hand gesture, receiving first hand gesture information from at least one external gesture information provider, and correcting the hand gesture based on the first hand gesture information; in response to determining that the information of the hand is not enough for identifying the hand gesture, receiving second hand gesture information from the at least one external gesture information provider, obtaining a predicted hand gesture, and obtaining the hand gesture based on the predicted hand gesture and the second hand gesture information.

The embodiments of the disclosure provide a non-transitory computer readable storage medium, the computer readable storage medium recording an executable computer program, the executable computer program being loaded by a host to perform steps of: determining whether information of a hand is enough for identifying a hand gesture of the hand; in response to determining that the information of the hand is enough for identifying the hand gesture, identifying the hand gesture, receiving first hand gesture information from at least one external gesture information provider, and correcting the hand gesture based on the first hand gesture information; in response to determining that the information of the hand is not enough for identifying the hand gesture, receiving second hand gesture information from the at least one external gesture information provider, obtaining a predicted hand gesture, and obtaining the hand gesture based on the predicted hand gesture and the second hand gesture information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
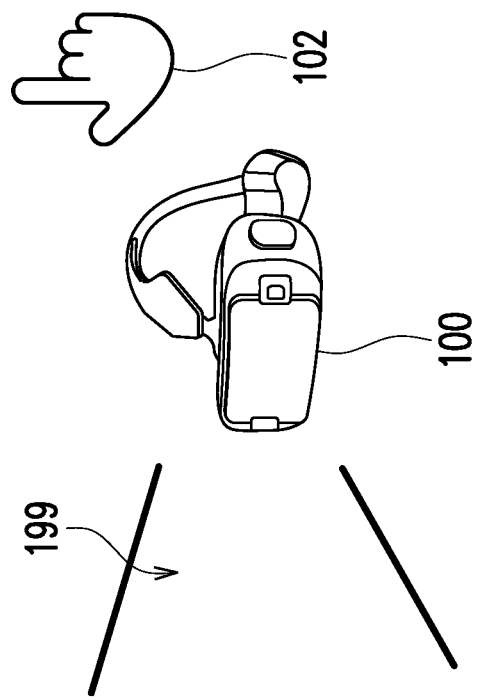
FIG. 1 shows a schematic diagram of hand gesture tracking.
Figure 1:
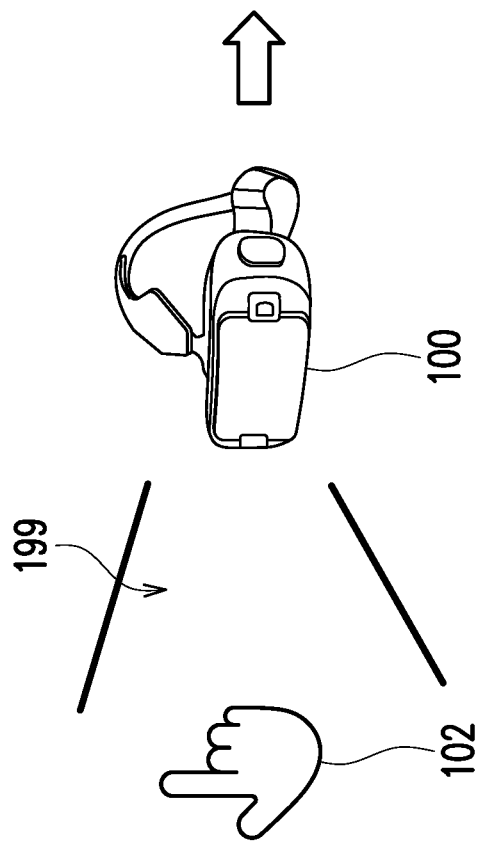

Reference will now be made in detail to the present preferred embodiments of the invention, examples of which are illustrated in the accompanying drawings. Wherever possible, the same reference numbers are used in the drawings and the description to refer to the same or like parts.

Figure 2A:
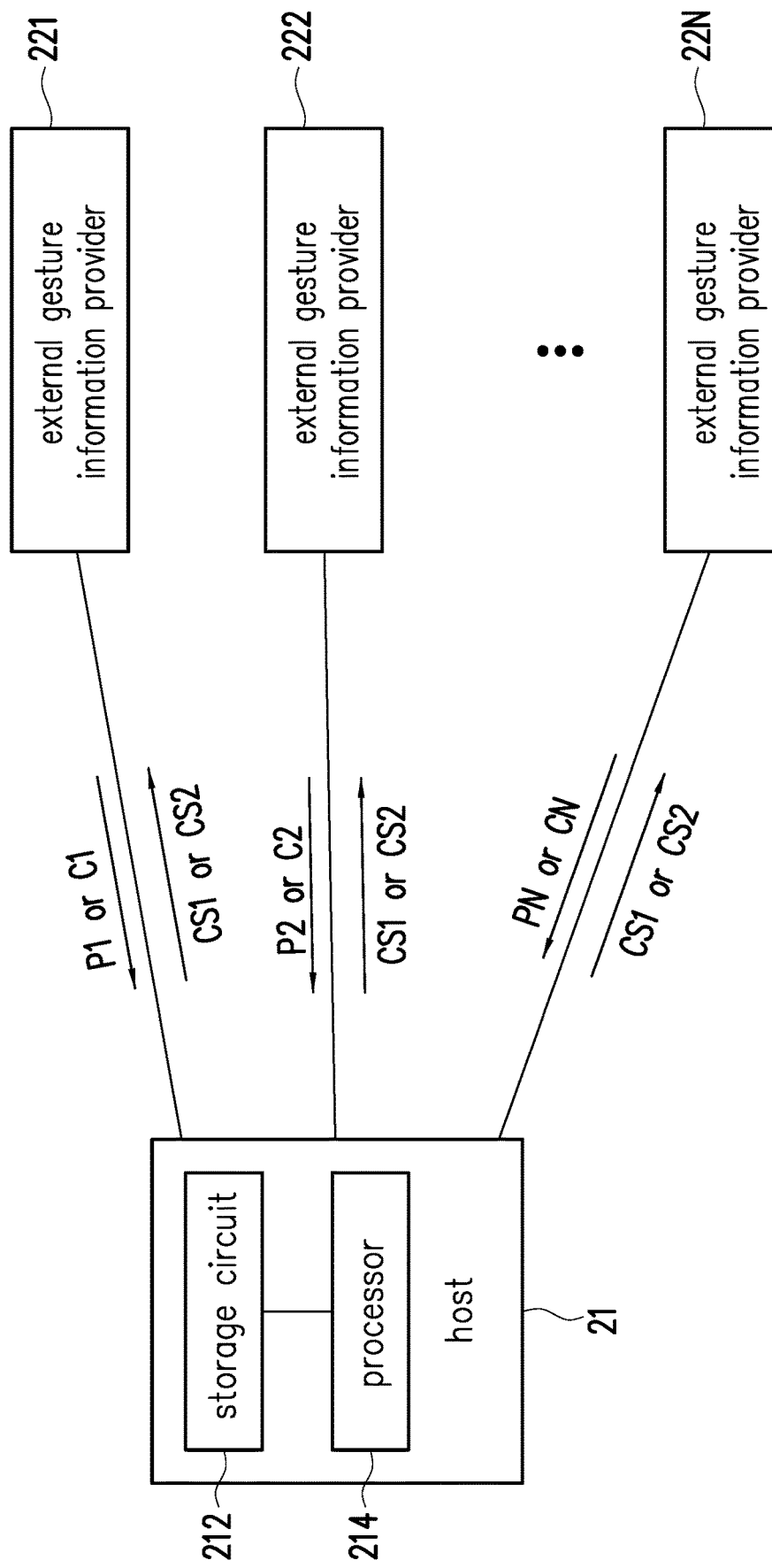
FIG. 2A is a functional diagram of a system for detecting hand gesture according to an embodiment of the disclosure.
Figure 2B:
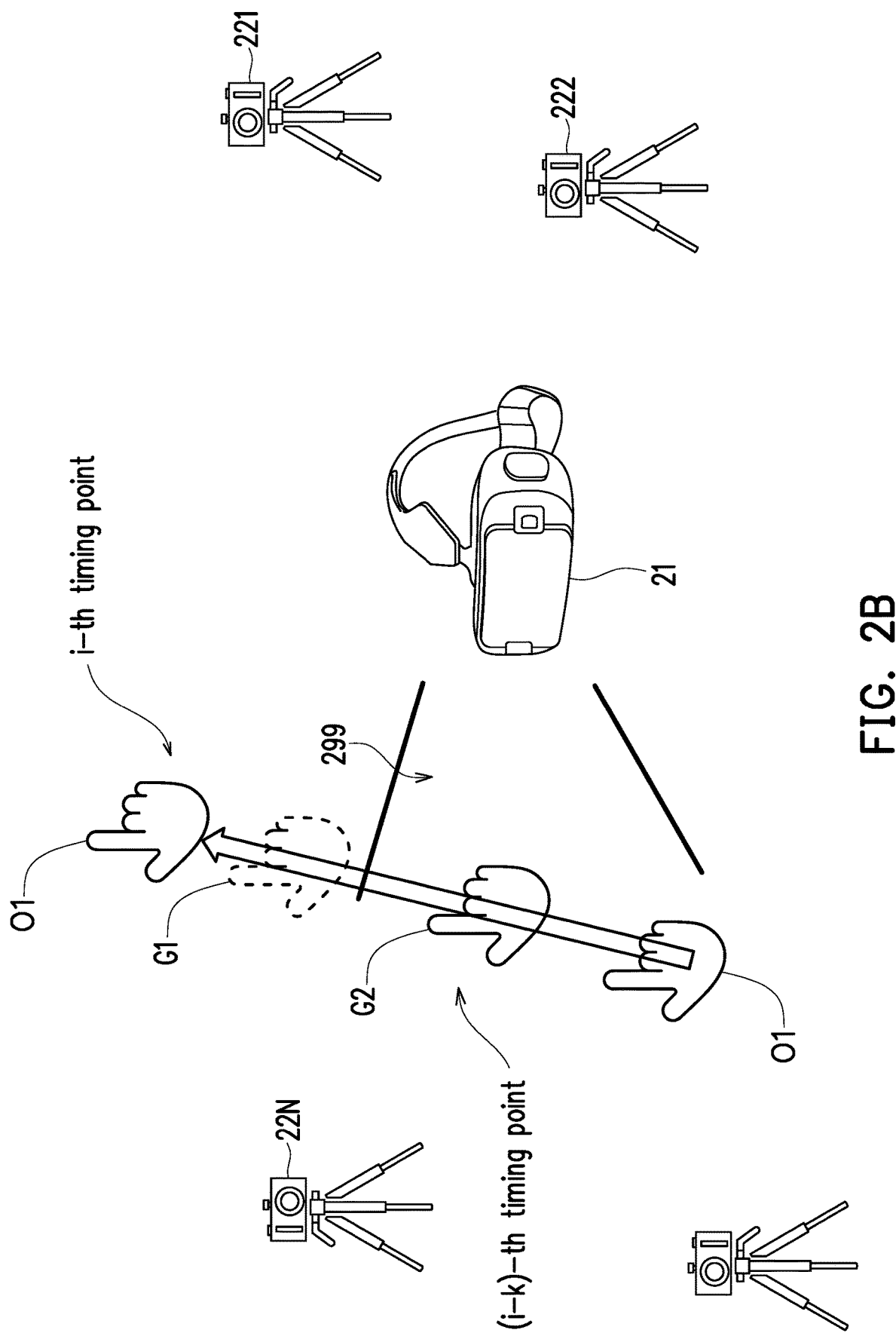
FIG. 2B is a schematic diagram of FIG. 2A.

See FIG. 2A and FIG. 2B, wherein FIG. 2A is a functional diagram of a system for detecting hand gesture according to an embodiment of the disclosure, and FIG. 2B is a schematic diagram of FIG. 2A.

In FIG. 2A, the system 200 includes a host 21 and external gesture information providers 221-22N, wherein the host 21 is connected with each of the external gesture information providers 221-22N via wireless communication protocols such as Bluetooth.

In various embodiments, the host 21 can be any device capable of performing tracking functions (e.g., inside-out tracking and/or outside-in tracking) on one or more to-be-tracked objects (e.g., the hand O1) within the FOV 299. In the embodiments of the disclosure, the FOV 299 can be an image-capturing range of one or more camera (e.g., tracking camera) on the host 21. When the to-be-tracked objects (e.g., the hand O1) is within the FOV 299, the cameras on the host 21 may capture images of the to-be-tracked objects, and the host 21 may track the pose of each to-be-tracked object based on the captured images, but the disclosure is not limited thereto.

In the embodiments of the disclosure, the host 21 can be an HMD for providing reality services to the user thereof, wherein the reality services include, but not limited to, a virtual reality (VR) service, an augmented reality (AR) service, an extended reality (XR), and/or a mixed reality, etc. In these cases, the host 21 can show the corresponding visual contents for the user to see, such as VR/AR/XR/MR visual contents.

In FIG. 2A, the host 21 includes a storage circuit 212 and a processor 214. The storage circuit 212 is one or a combination of a stationary or mobile random access memory (RAM), read-only memory (ROM), flash memory, hard disk, or any other similar device, and which records a plurality of modules that can be executed by the processor 214.

The processor 214 may be coupled with the storage circuit 212, and the processor 214 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, each of the external gesture information providers 221-22N can be a (external) camera capable of performing tracking functions to one or more to-be-tracked objects, such as a tracking camera external to the host 21. The external gesture information providers 221-22N can be disposed at an environment where the host 21 locates and moves.

In the embodiments of the disclosure, the hand O1 would be used as an example of the to-be-tracked object, and each of the external gesture information providers 221-22N can track the pose (i.e., the hand gesture) of the hand O1. In one embodiment, the hand O1 is predetermined to consist of a specific number (e.g., 21) of predetermined joints, and each of the external gesture information providers 221-22N can be used to track the pose (e.g., 3D position) of each predetermined joint.

In one embodiment, the host 21 may send a first control signal CS1 to each of the external gesture information providers 221-22N to ask each of the external gesture information providers 221-22N to provide the pose of some specific joint(s) of the predetermined joints on the hand O1. For example, the host 21 may ask each of the external gesture information providers 221-22N to only provide the pose of fingertip joint(s) on the hand O1 to the host 21. In the embodiment, the pose information provided by each of the external gesture information providers 221-22N in response to the first control signal CS1 may be referred to as first hand gesture information. In one embodiment, the first hand gesture information may be partial hand gesture information, which represents that each of the external gesture information providers 221-22N does not provide the tracked poses of all predetermined joints on the hand O1.

For example, the external gesture information providers 221 may provide first hand gesture information P1 to the host 21, wherein the first hand gesture information P1 may exemplarily include the poses of the fingertip joints on the hand O1 tracked by the external gesture information providers 221. For another example, the external gesture information providers 222 may provide first hand gesture information P2 to the host 21, wherein the first hand gesture information P2 may exemplarily include the poses of the fingertip joints on the hand O1 tracked by the external gesture information providers 222. Similarly, the external gesture information providers 222 may provide first hand gesture information PN to the host 21, wherein the first hand gesture information PN may exemplarily include the poses of the fingertip joints on the hand O1 tracked by the external gesture information providers 22N.

In another embodiment, the host 21 may send a second control signal CS2 to each of the external gesture information providers 221-22N to ask each of the external gesture information providers 221-22N to provide the tracked poses of all predetermined joints on the hand O1. In the embodiment, the pose information provided by each of the external gesture information providers 221-22N in response to the second control signal CS2 may be referred to as second hand gesture information. In one embodiment, the second hand gesture information may be complete hand gesture information, which represents that each of the external gesture information providers 221-22N provides the tracked poses of all predetermined joints on the hand O1.

For example, the external gesture information providers 221 may provide second hand gesture information C1 to the host 21, wherein the first hand gesture information P1 may exemplarily include the poses of all predetermined joints on the hand O1 tracked by the external gesture information providers 221. For another example, the external gesture information providers 222 may provide first hand gesture information P2 to the host 21, wherein the first hand gesture information P2 may exemplarily include the poses of all predetermined on the hand O1 tracked by the external gesture information providers 222. Similarly, the external gesture information providers 222 may provide first hand gesture information PN to the host 21, wherein the first hand gesture information PN may exemplarily include the poses of all predetermined on the hand O1 tracked by the external gesture information providers 22N.

In the embodiments of the disclosure, the processor 214 may access the modules stored in the storage circuit 212 to implement the method for detecting the hand gesture provided in the disclosure, which would be further discussed in the following.

Figure 3:
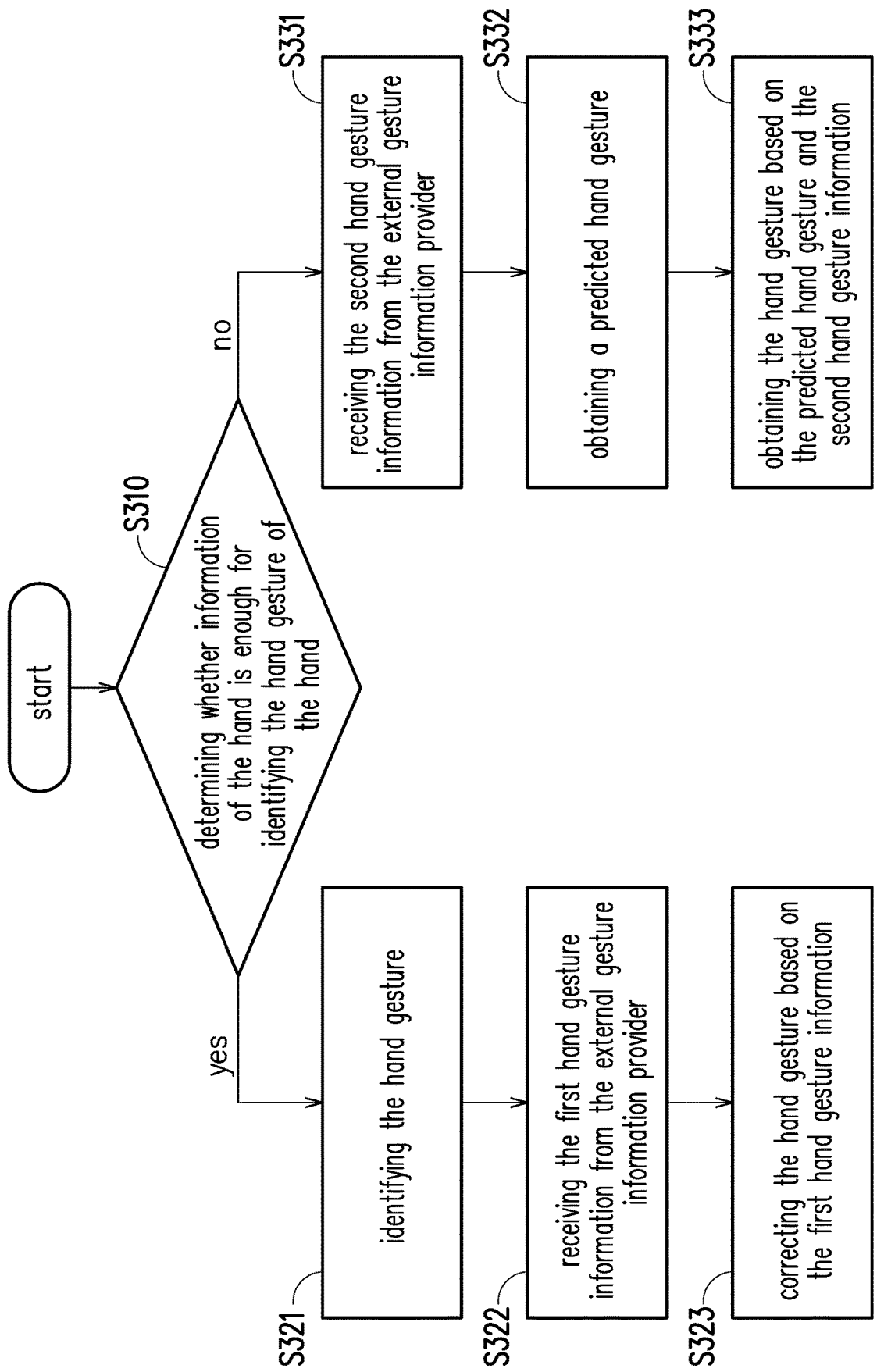
FIG. 3 shows a flow chart of the method for detecting the hand gesture according to an embodiment of the disclosure.

See FIG. 3, which shows a flow chart of the method for detecting the hand gesture according to an embodiment of the disclosure. The method of this embodiment may be executed by the host 21 in FIG. 2A and FIG. 2B, and the details of each step in FIG. 3 will be described below with the components shown in FIG. 2A and FIG. 2B.

Firstly, in step S310, the processor 214 determines whether information of the hand O1 is enough for identifying the hand gesture of the hand O1.

In one embodiment, the processor 214 detects joints on the hand gesture and determines whether the amount of the detected joints on the hand gesture is higher than an amount threshold. In different embodiments, the amount threshold can be determined by the designer as an amount enough for the processor 214 to track the pose of the hand O1.

In one embodiment, in response to determining that the amount of the detected joints on the hand gesture is higher than an amount threshold, the processor 214 determines that the information of the hand O1 is enough for identifying the hand gesture. In this case, even if some joints are untrackable due to, for example, being outside of the FOV 299 of the host 21 or being obstructed when the hand O1 is in certain angles, the processor 214 may predict/guess the pose of the untrackable joints based on the trackable joints, but the disclosure is not limited thereto.

On the other hand, in response to determining that the amount of the detected joints on the hand gesture is not higher than the amount threshold, the processor 214 determines that the information of the hand O1 is not enough for identifying the hand gesture.

In one embodiment, the processor 214 may perform an inside-out tracking based on the images of the hand O1 captured by the tracking camera to detect the joints on the hand gesture, but the disclosure is not limited thereto.

In another embodiment, the processor 214 may determine whether the hand O1 is in the FOV 299 of the camera (e.g., the tracking camera) of the host 21. In one embodiment, in response to determining that the hand O1 is in the FOV 299 of the camera of the host 21, the processor 214 determines that the information of the hand O1 is enough for identifying the hand gesture. On the other hand, in response to determining that the hand O1 is not in the FOV 299 of the camera of the host 21, the processor 214 determines that the information of the hand O1 is not enough for identifying the hand gesture.

In a first embodiment where the information of the hand O1 is determined to be enough for identifying the hand gesture of the hand O1 (e.g., the hand O1 is within the FOV 299), the processor 214 may subsequently perform steps S321 to S323 to obtain the hand gesture of the hand O1.

In step S321, the processor 214 identifies the hand gesture. In one embodiment, the processor 214 may track the hand gesture based on, for example, the conventional inside-out tracking mechanism, which would not be discussed in detail.

Therefore, after step S321, the hand gesture (e.g., the 6 degree-of-freedom (6DOF)) of the hand O1 has been obtained.

In step S322, the processor 214 receives the first hand gesture information P1 to PN from the external gesture information provider 221 to 22N. As mentioned in the above, each of the first hand gesture information P1 to PN may only include the poses of some specific joints on the hand O1 (e.g., the fingertip joints on the hand O1). For better understanding, the poses of the specific joints carried in the first hand gesture information P1 to PN would be referred to as first poses.

In step S323, the processor 214 corrects the hand gesture based on the first hand gesture information P1 to PN. In one embodiment, the processor 214 retrieves the pose of each specific joint in the hand gesture detected by the host in step S321. For example, if the considered specific joints are the fingertip joints on the hand O1, the processor 214 may retrieve the poses of the fingertip joints from the hand gesture detected in step S321, but the disclosure is not limited thereto. For better understanding, the poses of the specific joints retrieved from the hand gesture detected in step S321 would be referred to as second poses.

Next, the processor 214 may correct the hand gesture obtained in step S321 via combining the second pose of each specific joint with the corresponding first pose.

In brief, since the processor 214 can obtain the first poses of the specific joints based on the first hand gesture information P1 to PN, the processor 214 may refine the second poses of the specific joints on the hand gesture obtained in step S321 based on the first poses of the specific joints.

For example, assuming that the fingertip joint of the thumb on the hand O1 is one of the considered specific joint, the processor 214 can retrieve the second pose of the fingertip joint of the thumb from the hand gesture obtained in step S321. In addition, the processor 214 can retrieve the first pose of the fingertip joint of the thumb from each of the first hand gesture information P1 to PN. Next, the processor 214 may combine the second pose of the fingertip joint of the thumb with the first pose of the fingertip joint of the thumb carried in each of the first hand gesture information P1 to PN as a corrected pose of the fingertip joint of the thumb. In one embodiment, the processor 214 may take a linear or nonlinear combination of the first poses and the second pose when combining them, but the disclosure is not limited thereto.

After performing similar operation on other specific joint, the corrected poses of other specific joints can be according obtained. As such, the hand gesture obtained in step S321 can be more accurate since the poses of the specific joints on the hand O1 have been corrected in step S323.

In particular, when the information of the hand O1 is enough for identifying the hand gesture of the hand O1 (e.g., the hand O1 is in the FOV 299), the processor 214 may need to render the hand gesture with a higher frame rate for providing better visual experience to the user. In this case, the processor 214 may not have enough resources to receive the second hand gesture information C1 to CN from the external gesture information provider 221 to 22N and/or perform a more complete correction to the hand gesture obtained in step S321.

Therefore, when the information of the hand O1 is enough for identifying the hand gesture of the hand O1, the processor 214 may ask the external gesture information provider 221 to 22N to simply provide the first hand gesture information P1 to PN and accordingly correct the poses of some specific joints (e.g., some important joints and/or some joints more possible to be occluded). In this case, the processor 214 may provide a better result of hand gesture tracking without consuming too much additional resources.

In a second embodiment where the information of the hand O1 is determined to be not enough for identifying the hand gesture of the hand O1 (e.g., the hand O1 is outside of the FOV 299), the processor 214 may subsequently perform steps S331 to S333 to obtain the hand gesture of the hand O1.

In the second embodiment, assuming that the hand O1 was within the FOV 299 and leaves the FOV 299 at an i-th timing point as shown in FIG. 2B, wherein i is an index. In this case, the processor 214 may determine the hand gesture based on steps S321 to S323 before the i-th timing point.

At the i-th timing point, since the hand O1 has left the FOV 299, the processor 214 may determine that the information of the hand O1 is not enough for identifying the hand gesture of the hand O1 and subsequently perform steps S331 to S333.

In step S331, the processor 214 receive the second hand gesture information C1 to CN from the external gesture information provider 221-22N.

In one embodiment, in response to determining that the information of the hand O1 is changed from being enough for identifying the hand gesture to be not enough for identifying the hand gesture, the processor 214 may send the second control signal CS2 to each external gesture information provider 221 to 22N for requesting the external gesture information provider 221 to 22N to provide the corresponding second hand gesture information C1 to CN, but the disclosure is not limited thereto.

As mentioned in the above, each of the second hand gesture information C1 to CN includes the poses of all predetermined joints on the hand O1. For better understanding, the poses of all predetermined joints carried in the second hand gesture information C1 to CN would be referred to as third poses.

In step S332, the processor 214 obtain a predicted hand gesture G1. In the second embodiment, in response to determining that the information of the hand O1 has changed from being enough for identifying the hand gesture to be not enough for identifying the hand gesture at the i-th timing point, the processor 214 may retrieve a previous hand gesture G2 identified at an (i−k)-th timing point, wherein k is a positive integer. Next, the processor 214 may predict the hand gesture at the i-th timing point based on the previous hand gesture as the predicted hand gesture G1.

In different embodiments, k can be any desired value of the designer. For better predicting the predicted hand gesture G1, k may be determined to be 1, such that the processor 214 would retrieve the hand gesture identified right before the hand O1 leaves the FOV 299 as the previous hand gesture G2, but the disclosure is not limited thereto.

In the second embodiment, the mechanism for predicting the predicted hand gesture G1 based on the previous hand gesture G2 can be referred to related hand gesture prediction arts, which would not be further discussed herein.

In step S333, the processor 214 obtains the hand gesture based on the predicted hand gesture G1 and the second hand gesture information C1 to CN.

In one embodiment, the processor 214 obtains a reference hand gesture based on the second hand gesture information C1 to CN of each of the external gesture information provider 221 to 22N. In one embodiment, the processor 214 obtains a first hand gesture detected by the respective external gesture information provider 221 to 22N based on the corresponding second hand gesture information C1 to CN. For example, the processor 214 may retrieve the third pose of each predetermined joint from the second hand gesture information C1 and accordingly construct the first hand gesture corresponding to the external gesture information provider 221 by connecting the predetermined joints. For another example, the processor 214 may retrieve the third pose of each predetermined joint from the second hand gesture information C2 and accordingly construct the first hand gesture corresponding to the external gesture information provider 222 by connecting the predetermined joints. Similarly, the processor 214 may retrieve the third pose of each predetermined joint from the second hand gesture information CN and accordingly construct the first hand gesture corresponding to the external gesture information provider 22N by connecting the predetermined joints, but the disclosure is not limited thereto.

Next, the processor 214 combines the first hand gesture detected by the respective external gesture information provider 221 to 22N as the reference hand gesture. In one embodiment, the processor 214 may take a linear/nonlinear combination of the first hand gesture corresponding to each external gesture information provider 221 to 22N as the reference hand gesture. In one embodiment, the processor 214 may take a first average of the first hand gesture detected by the respective external gesture information provider 221 to 22N as the reference hand gesture, but the disclosure is not limited thereto.

Afterwards, the processor 214 may combine the predicted hand gesture G1 with the reference hand gesture as the hand gesture of the hand O1 at the i-th timing point.

In one embodiment, the processor 214 may take a linear/nonlinear combination of the predicted hand gesture G1 and the reference hand gesture as the hand gesture of the hand O1. In one embodiment, the processor 214 may take a second average of the predicted hand gesture with the reference hand gesture as the hand gesture of the hand O1 at the i-th timing point.

In particular, when the information of the hand O1 is not enough for identifying the hand gesture of the hand O1 (e.g., the hand O1 is not within the FOV 299), the processor 214 may need to render the hand gesture with a lower frame rate for preparing more resources for processing the second hand gesture information C1 to CN, such that the hand gesture of the hand O1 can be refined accordingly. Therefore, the embodiments of the disclosure provide a solution for determining the hand gesture of the hand O1 when the information of the hand O1 is not enough for identifying the hand gesture of the hand O1 (e.g., the hand O1 is not within the FOV 299).

In the second embodiment, the processor 214 may further correct the first hand gesture detected by the respective external gesture information provider 221 to 22N at least based on an correcting factor of the respective external gesture information provider 221 to 22N before combining them as the reference hand gesture.

In the embodiment where each of the external gesture information provider 221 to 22N is an external camera, the considered correcting factor of the respective external gesture information provider 221 to 22N may include the extrinsic parameter(s) of the respective external gesture information provider 221 to 22N. The detail of correcting the first hand gesture detected by the respective external gesture information provider 221 to 22N based on the corresponding extrinsic parameter(s) may be referred to the related art, which would not be further discussed herein.

In one embodiment, in response to determining that the information of the hand O1 is changed from being not enough for identifying the hand gesture to be enough for identifying the hand gesture, the processer 214 may send the first control signal CS1 to each external gesture information provider 221 to 22N for requesting the external gesture information provider 221 to 22N to provide the corresponding first hand gesture information P1 to PN, but the disclosure is not limited thereto. In this case, the processor 214 may proceed to perform steps S321 to S323, and the details may be referred to the descriptions in the above.

In one embodiment, after the hand gesture of the hand O1 has been determined in steps S321 or S333, the processor 214 may accordingly adjust the visual content of the reality service based on the hand gesture of the hand O1. For example, the processor 214 may render the hand gesture of the hand O1 in the visual content for the user to see and interact with the reality service, but the disclosure is not limited thereto.

In addition, although only one hand O1 is used for explaining the concept of the disclosure, the embodiments of the disclosure can be used to simultaneously track the hand gestures of multiple hands. For example, for some hands within the FOV 299, the processor 214 may perform steps S321 to S323 to obtain the hand gestures thereof. For some hands outside of the FOV 299, the processor 214 may perform steps S331 to S333 to obtain the hand gestures thereof, but the disclosure is not limited thereto.

The disclosure further provides a computer readable storage medium for executing the method for detecting the hand gesture. The computer readable storage medium is composed of a plurality of program instructions (for example, a setting program instruction and a deployment program instruction) embodied therein. These program instructions can be loaded into the host 21 and executed by the same to execute the method for detecting the hand gesture and the functions of the host 21 described above.

In summary, the embodiments of the disclosure provide a mechanism for the host to determine hand gesture while cooperating with one or more external gesture information provider when the to-be-tracked hand is invisible to the host. In addition, when the to-be-tracked hand is visible to the host, the embodiments of the disclosure provides a mechanism to achieve higher accuracy for hand gesture tracking by considering the first hand gesture information provided by the external gesture information provider(s).

Moreover, the embodiments of the disclosure can be used to implement the hand gesture tracking for multiple hands. Accordingly, the accuracy of hand gesture tracking can be improved, such that the host can provide a better reality service for the user.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for detecting a hand gesture, adapted to a host, comprising:
   tracking, by using a tracking camera of the host, information of a hand;
   determining whether the information of the hand is enough for identifying a hand gesture of the hand;
   in response to determining that the information of the hand is enough for identifying the hand gesture, identifying the hand gesture based on an image of the hand captured by the tracking camera, receiving first hand gesture information from at least one external gesture information provider, and correcting the identified hand gesture based on the first hand gesture information, wherein the at least one external gesture information provider comprises at least one external tracking camera;
   in response to determining that the information of the hand is not enough for identifying the hand gesture, receiving second hand gesture information from the at least one external gesture information provider, determining a predicted hand gesture, and identifying the hand gesture based on the predicted hand gesture and the second hand gesture information, wherein the second hand gesture information comprises more hand gesture information than the first hand gesture information; and
   rendering, by the host, visual content of a reality service based on the identified hand gesture.

2. The method according to claim 1, wherein the step of determining whether information of the hand gesture is enough for identifying the hand gesture comprises:
   detecting joints on the hand gesture;
   in response to determining that an amount of the detected joints on the hand gesture is higher than an amount threshold, determining that the information of the hand is enough for identifying the hand gesture;
   in response to determining that the amount of the detected joints on the hand gesture is not higher than the amount threshold, determining that the information of the hand is not enough for identifying the hand gesture.

3. The method according to claim 1, wherein the step of determining whether information of the hand gesture is enough for identifying the hand gesture comprises:
   determining whether the hand is in a field of view of a camera of the host;
   in response to determining that the hand is in the field of view of the camera of the host, determining that the information of the hand is enough for identifying the hand gesture;
   in response to determining that the hand is not in the field of view of the camera of the host, determining that the information of the hand is not enough for identifying the hand gesture.

4. The method according to claim 1, wherein the first hand gesture information comprises partial hand gesture information from the respective external gesture information provider, and the partial hand gesture information from the respective external gesture information provider comprises a first pose of at least one specific joint on the hand detected by the respective external gesture information provider.

5. The method according to claim 4, wherein the step of correcting the identified hand gesture based on the first hand gesture information comprises:
   retrieving a second pose of each specific joint in the identified hand gesture detected by the host;
   combining the second pose of each specific joint with the corresponding first pose.

6. The method according to claim 4, wherein the at least one specific joint comprises fingertip joints on the hand.

7. The method according to claim 1, further comprising:
   in response to determining that the information of the hand is changed from being not enough for identifying the hand gesture to be enough for identifying the hand gesture, sending a first control signal to each external gesture information provider, wherein the first control signal controls each external gesture information provider to provide the corresponding first hand gesture information;
   in response to determining that the information of the hand is changed from being enough for identifying the hand gesture to be not enough for identifying the hand gesture, sending a second control signal to each external gesture information provider, wherein the second control signal controls each external gesture information provider to provide the corresponding second hand gesture information.

8. The method according to claim 1, wherein the step of determining the predicted hand gesture comprises:
   in response to determining that the information of the hand has changed from being enough for identifying the hand gesture to be not enough for identifying the hand gesture at an i-th timing point, retrieving a previous hand gesture identified at an (i−k)-th timing point, wherein i is an index, k is a positive integer;
   predicting the hand gesture at the i-th timing point based on the previous hand gesture as the predicted hand gesture.

9. The method according to claim 1, wherein the hand is predetermined to consist of a specific number of predetermined joints, and the second hand gesture information comprises complete hand gesture information from the respective external gesture information provider, and the complete hand gesture information from the respective external gesture information provider comprises a third pose of each predetermined joint on the hand detected by the respective external gesture information provider.

10. The method according to claim 1, wherein the step of identifying the hand gesture based on the predicted hand gesture and the second hand gesture information comprises:

determining a reference hand gesture based on the second hand gesture information of each of the external gesture information provider; and combining the predicted hand gesture with the reference hand gesture as the identified hand gesture.

11. The method according to claim 10, wherein the at least one external gesture information provider comprises a plurality of external gesture information providers, and the step of determining the reference hand gesture based on the second hand gesture information of each of the external gesture information provider comprises:

obtaining a first hand gesture detected by the respective external gesture information provider based on the corresponding second hand gesture information;

combining the first hand gesture detected by the respective external gesture information provider as the reference hand gesture.

12. The method according to claim 11, wherein the step of combining the first hand gesture detected by the respective external gesture information provider as the reference hand gesture comprises:

taking a first average of the first hand gesture detected by the respective external gesture information provider as the reference hand gesture.

13. The method according to claim 11, wherein before the step of combining the first hand gesture detected by the respective external gesture information provider as the reference hand gesture, the method further comprises:

correcting the first hand gesture detected by the respective external gesture information provider at least based on a correcting factor of the respective external gesture information provider.

14. The method according to claim 13, wherein each of the external gesture information provider is an external camera, and the correcting factor of the respective external gesture information provider comprises an extrinsic parameter of the respective external gesture information provider.

15. The method according to claim 10, wherein the step of combining the predicted hand gesture with the reference hand gesture as the identified hand gesture comprises:

taking a second average of the predicted hand gesture with the reference hand gesture as the identified hand gesture.

16. A system for detecting a hand gesture, comprising:

a host, configured to perform:

tracking, by using a tracking camera of the host, information of a hand;

determining whether the information of the hand is enough for identifying a hand gesture of the hand;

in response to determining that the information of the hand is enough for identifying the hand gesture, identifying the hand gesture based on an image of the hand capture by the tracking camera, receiving first hand gesture information from at least one external gesture information provider, and correcting the identified hand gesture based on the first hand gesture information, wherein the at least one external gesture information provider comprises at least one external tracking camera;

in response to determining that the information of the hand is not enough for identifying the hand gesture, receiving second hand gesture information from the at least one external gesture information provider, determining a predicted hand gesture, and identifying the hand gesture based on the predicted hand gesture and the second hand gesture information, wherein the second hand gesture information comprises more hand gesture information than the first hand gesture information; and rendering, by the host, visual content of a reality service based on the identified hand gesture.

17. The system according to claim 16, wherein the system further comprises the at least one external gesture information provider connected with the host.

18. The system according to claim 17, wherein each of the external gesture information provider is an external camera.

19. The system according to claim 16, wherein the host performs:

in response to determining that the information of the hand is changed from being not enough for identifying the hand gesture to be enough for identifying the hand gesture, sending a first control signal to each external gesture information provider, wherein the first control signal controls each external gesture information provider to provide the corresponding first hand gesture information;

in response to determining that the information of the hand is changed from being enough for identifying the hand gesture to be not enough for identifying the hand gesture, sending a second control signal to each external gesture information provider, wherein the second control signal controls each external gesture information provider to provide the corresponding second hand gesture information.

20. A non-transitory computer readable storage medium, the computer readable storage medium recording an executable computer program, the executable computer program being loaded by a host to perform steps of:

tracking, by using a tracking camera of the host, information of a hand;

determining whether the information of the hand is enough for identifying a hand gesture of the hand;

in response to determining that the information of the hand is enough for identifying the hand gesture, identifying the hand gesture based on an image of the hand captured by the tracking camera, receiving first hand gesture information from at least one external gesture information provider, and correcting the identified hand gesture based on the first hand gesture information, wherein the at least one external gesture information provider comprises at least one external tracking camera;

in response to determining that the information of the hand is not enough for identifying the hand gesture, receiving second hand gesture information from the at least one external gesture information provider, determining a predicted hand gesture, and identifying the hand gesture based on the predicted hand gesture and the second hand gesture information, wherein the second hand gesture information comprises more hand gesture information than the first hand gesture information; and rendering, by the host, visual content of a reality service based on the identified hand gesture.

* * * * *